April 14, 1953  E. H. BROCKMAN ET AL  2,634,570
HORIZONTAL TOPPER AND LOADER
Filed May 6, 1949  6 Sheets-Sheet 1

INVENTOR.
EARL H. BROCKMAN  WILLIAM B. ALLISON
MATTHEW M. MAXWELL  KENNETH S. OVREGAARD
BY  CHARLES B. STEVENSON

Beale and Jones
ATTORNEYS.

April 14, 1953   E. H. BROCKMAN ET AL   2,634,570
HORIZONTAL TOPPER AND LOADER
Filed May 6, 1949   6 Sheets-Sheet 3

INVENTOR.
EARL H. BROCKMAN   WILLIAM B. ALLISON
MATTHEW M. MAXWELL   KENNETH S. OVREGAARD
BY  CHARLES B. STEVENSON

Beale and Jones
ATTORNEYS.

April 14, 1953     E. H. BROCKMAN ET AL     2,634,570
HORIZONTAL TOPPER AND LOADER Filed May 6, 1949     6 Sheets-Sheet 5

Fig. 8

INVENTOR.
EARL H. BROCKMAN WILLIAM B. ALLISON
MATTHEW M. MAXWELL KENNETH S. OVREGAARD
BY CHARLES B. STEVENSON

Beale and Jones
ATTORNEYS.

April 14, 1953     E. H. BROCKMAN ET AL     2,634,570
HORIZONTAL TOPPER AND LOADER Filed May 6, 1949     6 Sheets-Sheet 6

INVENTOR.
EARL H. BROCKMAN   WILLIAM B. ALLISON
MATTHEW M. MAXWELL   KENNETH S. OVREGAARD
BY   CHARLES B. STEVENSON Beale and Jones
ATTORNEYS.

Patented Apr. 14, 1953

2,634,570

UNITED STATES PATENT OFFICE 2,634,570

HORIZONTAL TOPPER AND LOADER

Earl H. Brockman, William B. Allison, Matthew M. Maxwell and Kenneth S. Ovregaard, Caldwell, Idaho, and Charles B. Stevenson, Wilmington, Calif., assignors to Idaho Egg Producers, Caldwell, Idaho, a corporation of Idaho Application May 6, 1949, Serial No. 91,788

11 Claims. (Cl. 56—23)

Our invention relates to a combined forage harvester and loader in which the harvester elements remove the tops or appendages of beets and other vegetation, mangle the removed cut and create air currents in which the removed cut is elevated to a loading station.

An object of the invention is to provide a pair of rotary members or toppers each having a plurality of whiplashes rotatable therewith, which positively remove the tops or appendages of plants.

Another object of the invention is to provide a pair of revolvable toppers which not only remove the tops or appendages of plants but also mangle and break up the cut.

A further object of the invention resides in arranging a pair of rotatable toppers in rotatable relation so that air currents are created which elevate and carry away the removed and mangled cut through a hood arranged over the rotatable toppers.

Another object of the invention is to provide a hood over the revolvable toppers so as to form a pneumatic pump therewith by which the air currents created by the revolvable toppers are forced to converge upward toward and pass through a discharge station.

Another object of the invention is to arrange the axes of the revolvable toppers substantially parallel to each other and generally transverse to the swatch or rows of the plants to be removed, wherein any plant tops lying near the ground and missed by the leading topper are picked up and severed by the trailing topper.

A further object of the invention resides in providing means whereby the distance between the axes of the revolvable toppers may be increased or decreased so as to increase or decrease the distance between the ends of the whiplashes.

Another object of the invention is to provide a mounting for the pair of revolvable toppers so that the distance between the surface of the ground and the axes of the toppers may be increased or decreased.

A still further object of the invention resides in mounting the revolvable topper in a harvester framework and supporting one end of the framework on a vertically adjustable truck which is provided with stabilizing means to prevent sidewise swaying of the harvester and means to maintain the axes of the revolvable toppers substantially parallel with the ground when traversing uneven ground.

Another object of the invention is to mount the revolvable toppers in a framework and to provide vertically adjustable supports for the forward and rear ends of the frame whereby the distance of the frame from the ground may be varied.

Still further objects and the entire scope of applicability of the present invention will become apparent from the detailed description given hereinafter; it should be understood, however, that the detailed description and specific examples are given by way of illustration only and, while indicating preferred embodiments of the invention, are not given by way of limitation, since various changes and modifications within the spirit and scope of the invention will become apparent to those skilled in the art from this detailed description.

Figure 1:
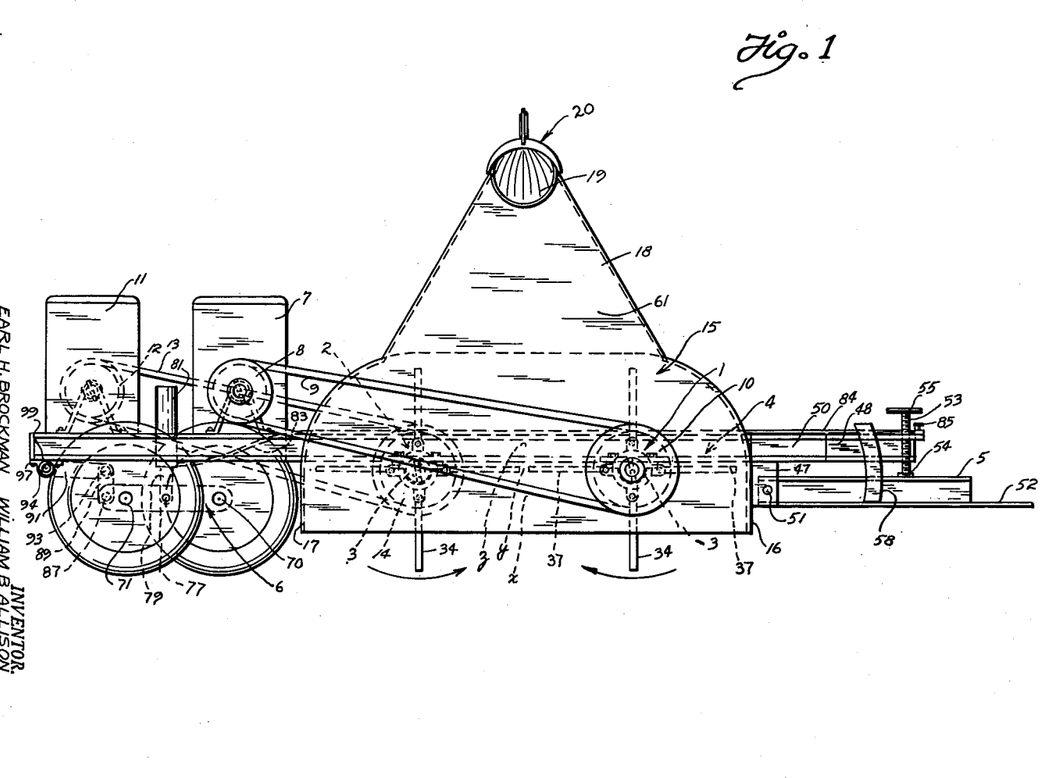
Figure 1 is a side elevation of the harvester and loader illustrating an embodiment of our invention.
Figure 2:
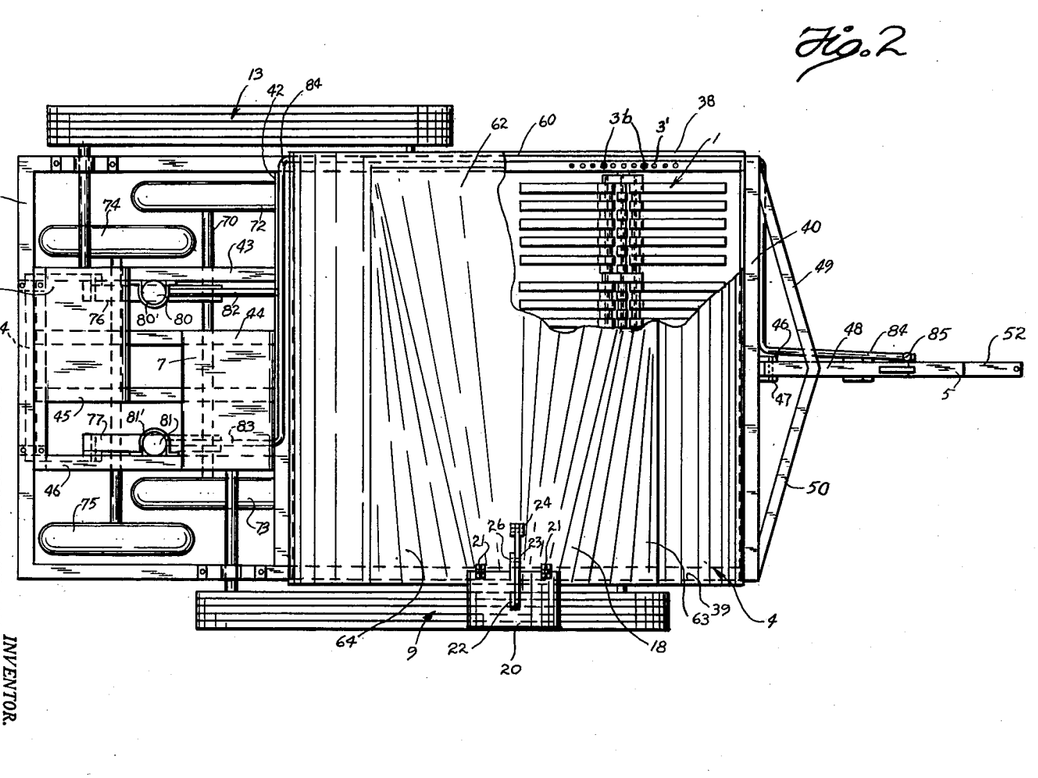
Figure 2 is a plan view of the structure shown in Fig. 1 with a portion of the hood broken away over the forward revolvable topper showing the mounting of the whiplashes and an adjustable mounting of one of the shaft bearings of the topper.
Figure 3:
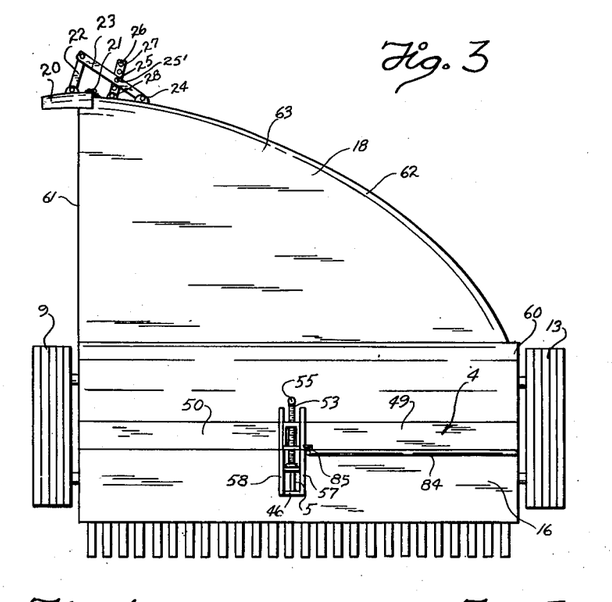
Figure 3 is an elevation of the front end of the harvester and loader.

Referring to Figures 1, 2 and 3, numeral 1 indicates generally the leading revolvable topper member which rotates clockwise and 2 indicates generally the trailing revolvable topper rotating counterclockwise. Toppers 1 and 2 are mounted in suitable bearings 3 attached to the side members of a rectangular frame generally indicated at 4. Frame 4 is adjustably supported at its forward end by a tongue 5 attached to a pulling means such as a tractor, not shown, while the rear end of frame 4 is supported by a set of trucks generally indicated at 6. In the embodiment here shown an internal combustion engine 7, mounted on the rear of the frame, has a drive pulley 8 which is connected with a pulley 10 on topper 1 by means of drive belts generally indicated at 9. A similar mounted engine 11 having a drive pulley 12 rotates topper 2 through connecting belts, generally indicated at 13, leading from engine pulley 12 to a pulley 14 on topper 2.

A hood 15 in the first embodiment, illustrated in Figures 1, 2 and 3, is mounted on the frame 4 over the revolvable toppers 1 and 2. This hood is comprised of lower depending skirt portions 16 and 17 which extend downwardly towards the ground over the revolvable toppers 1 and 2 and an upper transition portion or discharge duct 18 having a discharge aperture or station at 19 formed therein. At the extreme upper portion of transition portion 18 is mounted a deflector 20 hinged at 21 to the transition portion 18 of the hood. An adjusting arm 22 is pivotally connected at its lower end to the upper mid-portion of deflector 20 and has its upper end pivotally connected to a second arm 23 which is pivotally supported at its lower end in a bracket 24 attached to the hood portion 18. Arm 23 is apertured at 25 to receive a securing pin 25' which passes through any one of a plurality of holes 26 provided in arm 27, pivotally secured in a bracket 28 attached to the hood portion 18. By selecting any one of the holes 26 for securing the arm 23, the deflector 20 may be positioned nearer to or further away from discharge aperture or station 19 so as to direct the flow of the cut plant tops as they leave the hood portion 18 of the loader. The cut and mangled tops of the plants being harvested may be loaded into a truck traveling alongside the harvester with its truck body under the discharge station 19 of the harvester and conveyor or the cut may be discharged to the ground.

Figure 4:
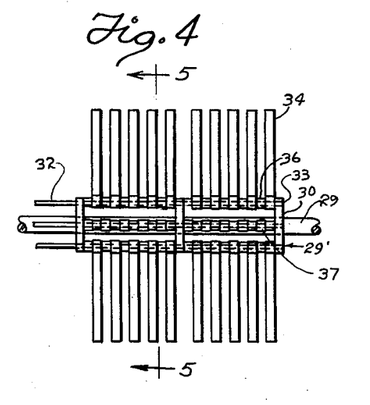
Figure 4 is a side elevation showing a section of one end of one of the revolvable toppers.
Figure 5:
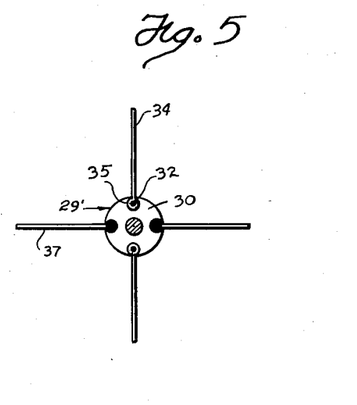
Figure 5 is an end view of the revolvable topper shown in Figure 4.

Revolvable toppers 1 and 2 are identical in construction. Referring to Figure 4, a section of one of the toppers is shown having a core generally indicated at 29' built up around a shaft 29. Mounted on shaft 29 are circular metal plates 30 which are secured in spaced relation on the shaft as by welding. These plates serve as supports for four rods 32 which are supported in apertures 33 positioned equidistant from the center of the plate at a 90° angular spacing. Plates 30 are so spaced as to form sections in which five whiplashes 34 of leather, rubber or composition are carried by each rod. Whiplashes 34 are formed with an eye or attaching end 35 through which passes the rod 32. Tubular spacers 36 are slidably mounted on rods 32 so as to space the whiplashes 34. Each pair of diametrically positioned lashes in a section are positioned in off-set relationship to the remaining pair of lashes. Thus the lashes at 34 in Figure 4 are off-set from the lashes indicated at 37 and as the topper is rotated a cutting and mangling front is provided by the adjacently spaced sets of whiplashes, so also air currents are created by the rotating front of whiplashes.

The frame support 4 of a general rectangular shape is fabricated of angle irons having side members 38 and 39 and front and rear cross members 40 and 41 which are welded or bolted together. An intermediate cross member 42 connects with side members 38 and 39 toward the rear end of the frame and serves as a support for longitudinally extending members 43, 44, 45 and 46 which extend between member 42 and rear end member 41.

The front end of frame 4 is supported through an attached tongue 5. Two depending members 46 and 47 are secured to the front center portion of cross member 40 while a forwardly extending support member 48 is also secured to the center forward portion of cross member 40. This forwardly extending member 48 is given additional support by two brace members 49 and 50 whose outer ends are welded or bolted to the forward corners of frame 4.

Tongue 5 is formed of an I beam whose rear end is positioned between depending members 46 and 47 and pivotally attached thereto by a pivot bolt 51. The forward end of the I beam forming the tongue 5 has its upper flange and the web cut away leaving the forwardly extending attaching end 52 for attachment to the draft mechanism of a tractor. In order to guide tongue 5 there is secured to either side arcuate members 57 and 58 whose upper ends slidably abut each side of forwardly extending member 48.

In order to adjustably pivot frame 4 on the tongue 5 at pivot pin 51 there is provided a vertically extending jack screw 53 which is threadedly engaged in the forward end of member 48. This jack screw 53 is provided with a spherically shaped lower end for sliding engagement with an arcuate upper faced pad 54 secured to the upper adjacent surface of the tongue 5. A handle 55 is affixed to the upper end of the jack screw so that the screw may be screwed up or down to adjust the distance of frame 4 from the ground and thus the vertical position of the toppers 1 and 2.

Referring again to the hood, generally indicated at 15, the lower portion of this hood is formed of generally arcuate shaped front and rear skirt members 16 and 17 which extend throughout the length of the toppers and in close spaced relation thereto while the sides of this lower hood portion are formed of a right hand side member 60 and a left hand side member 61, see Figure 3. The upper portion of side member 61 extends upward and is of general triangular shape having at its upper apex area the discharge aperture or station 19 formed therein. Right hand end member 60 extends upward only a slight distance above the tops of the extended whiplashes of the toppers. The upper portion 18 of the hood 15 which is termed the transition portion is formed of left end member 61, and an arcuate shaped member 62, see Figures 2 and 3, which extends from the top of the right hand side 60 where it is wide to its narrower upper end at the discharge station 19. To complete the hood a front member or panel 63 and a rear panel 64 extend respectively from the upper edges of the front and rear hood members 16 and 17 to the front and rear edges of member 62. Thus, there is formed a hood 15 which converges from the zone above the toppers 1 and 2 into a discharge opening or station 19 at one side of the harvester.

As stopper 1 is rotated clockwise and topper 2 is rotated counterclockwise, see Figure 1, the whiplashes are held outward on a radius by centrifugal force. Thus, the toppers revolve toward each other in their lower 180° of rotation. The leading topper 1 as the harvester is advanced toward the right, see Figure 1, will have its whiplashes 34 and 37 first striking the tops of the plants to be removed and as the harvester advances each series of whiplashes will sever more of each plant. Any plants that are laid down by the whiplashes of topper 1 will be picked up and severed by the whiplashes of trailing topper 2 whose whiplashes rotate in the opposite direction from the lashes of topper 1. So also, any plants which were previously lying down or bent toward the ground that are not picked up and severed by the advancing topper will be picked up and severed by the trailing topper.

As the whiplashes of forward topper 1 and trailing topper 2 rotate inwardly toward each other, in opposite directions, and as the space between the toppers and the forward end 16 and rearward end 17 of the hood is restricted, air currents are set up which rise generally vertically between the inwardly running whiplashes on the toppers. These air currents carry with them the cut appendages of the plants. The hood 15, as described above, gradually converges into a rather narrow outlet station 19, and thus the air currents carrying the cut are made to converge by the converging sides of the hood and are discharged through the discharge aperture or station 19. The deflector 20, as previously described, directs the cut plants onto the ground or onto a truck traveling along the side of the harvester. As the appendages severed from the plants are carried on the advancing front of the whiplashes of topper 1 they tend to strike against the appendages similarly carried by the advancing front of the whiplashes of topper 2. A mangling action of the appendages takes place as the oppositely extending whiplashes pass through "approach zone $x$," "near zone $y$" and "receding zone $z$."

A truck generally indicated at 6, see Figures 1, 2, 10 and 11, forms a stabilizing support for the rear end of the combined harvester and loader. In this truck are a pair of tandem axles 70 and 71 off set end wise from each other. Axle 70 has mounted on its ends wheels 72 and 73, here shown as being provided with pneumatic tires. Axle 71 mounts wheels 74 and 75 so that wheel 74 is off set and trails wheel 72 and wheel 75 trails and is off set from wheel 73. Axles 70 and 71 are carried in horizontal beam members 76 and 77 that are in turn pivotally supported at their mid axle mounting points by vertically extending pistons 79 reciprocating respectively within hydraulic cylinders 80 and 81. Cylinder 80 is supported in a vertical position by a surrounding bracket 80' secured to the longitudinally extending frame member 43. Cylinder 81 is similarly mounted in a bracket 81' secured to frame member 46. The hydraulic cylinders are connected by pipes 82 and 83 with a common fluid supply line 84 leading along cross member 42, side member 38, front end member 40 and forwardly extending frame member 48 where a supply and control line from the tractor is connected through a cut off valve 85.

Figures 10, 11:
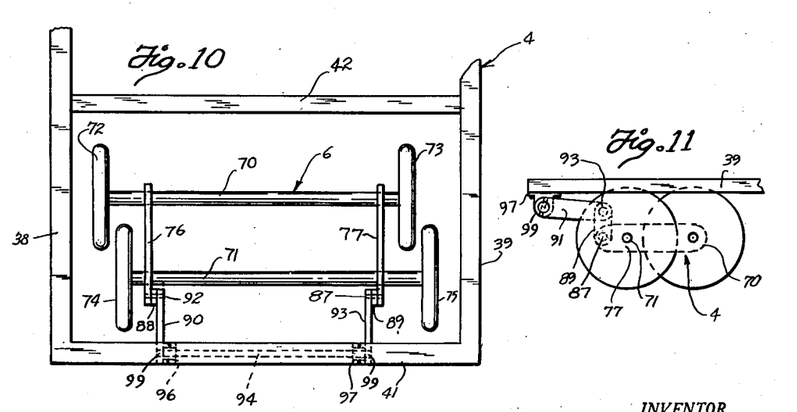
Figure 10 is a plan view with certain parts removed of the rear end of the frame showing the tandem axle truck and stabilizing linkage.
Figure 11 is a side elevation of the truck and its stabilizer linkage shown in Figure 10.

The stabilizer linkage for truck 6 is connected to the rearwardly extending ends of axle support beams 76 and 77 by pivot pins such as 87 shown in Fig. 11. A set of links 88 and 89 extending substantially vertical in normal position are pivotally attached to beams 76 and 77 respectively by pivot pins 87. At the upper ends of links 88 and 89 are respectively and pivotally attached a set of arms 90 and 91 by means of pivot pins 92 and 93. A torque rod 94 is rotatably supported in bearings 96 and 97 attached to the under side of rear cross member 41. The set of arms 90 and 91 are rigidly fixed to the adjacent ends of the torque rod 94 by through pins 99, see Figure 1.

Truck 6 in operation may have its distance from the frame increased or decreased by means of the hydraulic cylinders 80 and 81 and pistons 79 operating in each of the cylinders 80 and 81 as shown in Figures 1 and 2. Thus, revolvable toppers 1 and 2 may be brought closer or moved further away from the ground surface and the plant tops to be harvested.

The stabilizing linkage connected to torque rod 94 performs two important functions. Firstly, if one set of wheels on one side of the truck are at a different distance from the frame than the other set, due to an uneven ground surface, a strain or torque is set up in shaft 94, which will tend to equalize the distance each set of wheels is from the frame. Secondly, the tandem wheels 72, 74, and 73, 75 are mounted on their axles offset from each other so that one trails the other slightly, but not in the same path. The mounting between the axles at each end is rigid, i. e., beams 76 and 77 rigidly support axles 70 and 71, so that the axles act as a single unit. Thus, if one wheel should be following a corrugation or pass over a depression in the ground surface, the load is shifted to the other wheel.

In Figures 6, 7, 8 and 9 there is a conventional showing of a modified form of loading hood with a discharge or outlet conduit for the cut forage. Revolvable toppers or beaters 1 and 2 previously described are shown in outline mounted within this modified form of hood in Figures 6, 8 and 9.

Figures 6, 7:
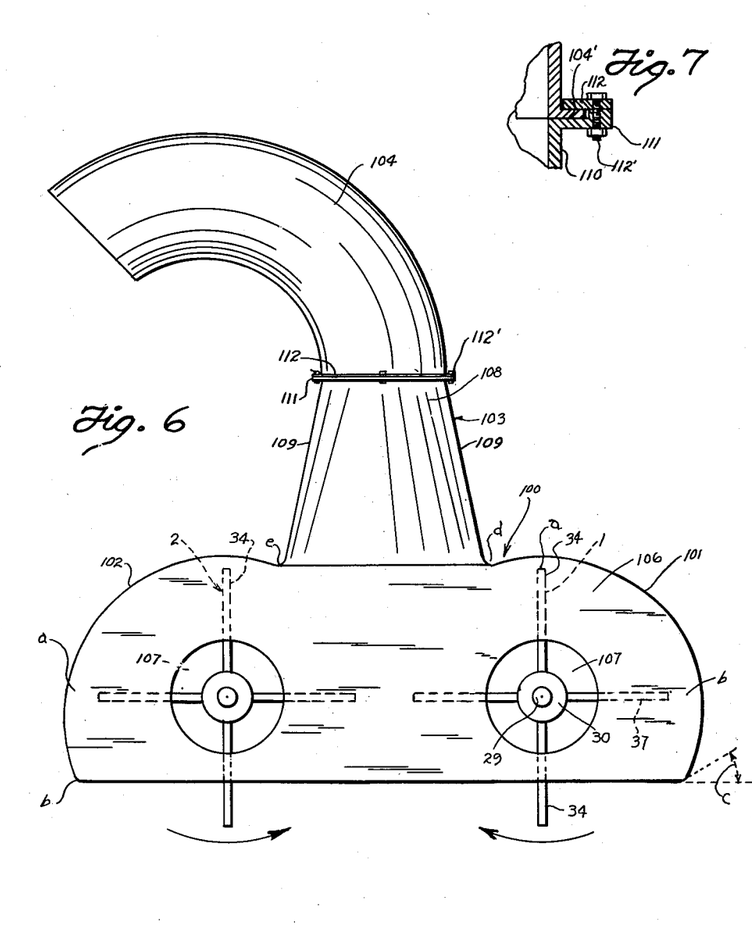
Figure 6 is a side elevation of a modified form of hood and swivelably mounted discharge conduit.
Figure 7 is an enlarged sectional view of the swivel joint between the rotatable discharge conduit and the transition portion of the hood.
Figure 8:
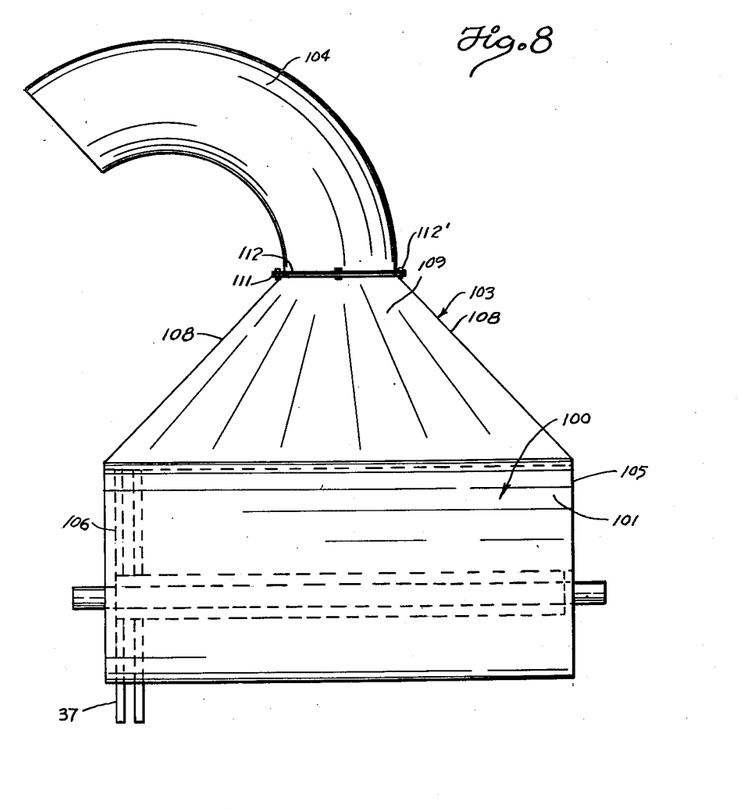
Figure 8 is a front end view of the modified form of hood of Figure 6 showing the discharge conduit rotated so as to discharge the cut forage to the left of the machine.
Figure 9:
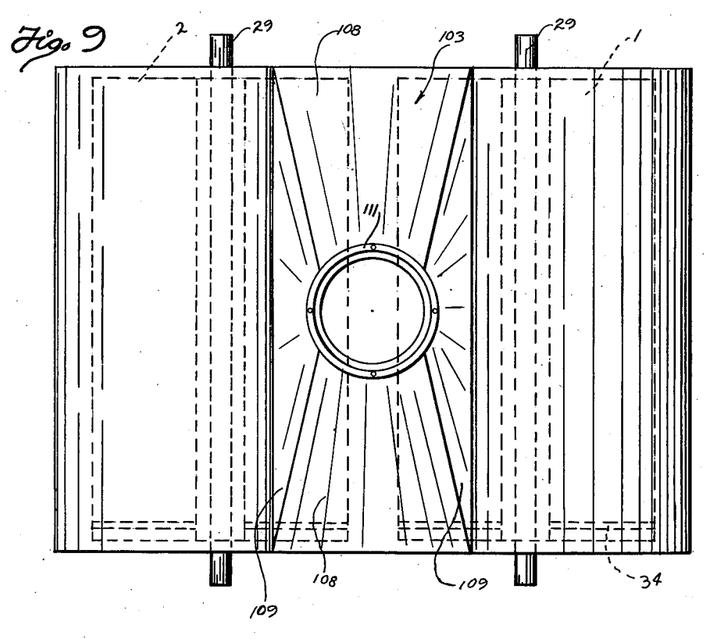
Figure 9 is a plan view of the modified form of hood shown in Figure 6 with the discharge conduit removed.

The modified hood is generally indicated at 100 and comprises lower skirt portions 101 and 102, a transition portion 103 just above the oppositely rotating toppers or beaters 1 and 2, and a discharge conduit 104 swivelly connected to the upper end of the transition portion of the hood.

In Figure 6, the skirt portions 101 and 102 over the toppers 1 and 2 are at a close clearance at $a$ to the extended whiplash 34 and at a clearance of about six inches at $b$ where they gradually curve inwardly toward the toppers to point $c$ where they cut sharply inward at an angle of 30° with the horizontal so as to feed back into the inwardly running toppers any carry over of the cut at $a$. Each of the skirts 101 and 102 extend as close to the ground as is practical without encountering field difficulties. The sides 105 and 106 of the skirts are identical in construction in this modification and are formed with suction openings or passages 107 at the ends of the topper shafts 29. These passages 107 are relatively large and provide sufficient air to the inwardly running toppers 1 and 2 to carry away the plant tops without picking up dust and loose dirt from the ground surface.

Transition portion 103 of the modified hood is fabricated of two side members 108 and two end members 109 which converge at their upper ends into a circular throat joint 110, shown in detail in Figure 7. At the juncture of the skirts 101 and 102 with the transition portion 103, the edges are curved or flared as at $d$ and $e$ so as to provide the least amount of resistance to the free flow of the cut material through the loader.

Discharge conduit, a substantial 90° elbow, is formed of a tubular pipe of about 18" diameter, has a flared collar portion 104', see Figure 7, at its bottom to form a swivel joint with the upper end of the transition portion 103. The upper end of the transition portion 103 where it converges into a circular throat 110, see Figure 7, is formed with a socket portion 111 for receiving the flanged collar 104' of the discharge pipe. An annular securing ring 112 bolted to socket portion 111 by bolts 112' holds the discharge pipe 104 in swivel relationship on top the transition portion 103 of the hood.

Operation

In placing the harvester and loader in operation, the distance that the ends of the whiplashes pass over the ground in their lowermost arcs of rotation is first adjusted. This adjustment of the whiplash clearance with the ground is accomplished by varying the height above the ground of frame 4 which carries the revolvable toppers and their whiplashes. The correct distance for the whiplash clearance with the ground surface will depend upon the type of plant being harvested and its condition as well as the character of the ground surface. If the ground surface is smooth, the whiplashes can be set with a small ground clearance and will not pick up dirt and dust from the ground. If the surface is very uneven then of necessity the clearance will be made greater.

Tongue 5 on the harvester is coupled at 52 to the draw bar of a tractor or other pulling means and jack screw 53 is screwed up or down the desired distance so that the forward end of the harvester pivots about pivot pin 51. Thus, the forward end of the harvester may be tilted or raised up or down with respect to the ground and the clearance of the whiplashes of the revolvable toppers with the ground is adjusted.

Adjustment of the height of the rear end of the harvester above the ground is carried out by connecting up a hydraulic pressure supply line at cut off valve 85 on the common hydraulic line 84 leading to the pistons and cylinders supporting the truck generally indicated at 6. By adjusting the fluid supply passing through valve 85, the rear end of frame 4 is raised or lowered over truck 6. This latter adjustment of the rear end of the machine also adjusts the distance of the ends of the whiplashes from the ground as they rotate nearest the ground surface.

The distance between the revolvable toppers 1 and 2 is next adjusted. The usual distance between the ends of the whiplashes of the two toppers at "near zone $y$", see Figure 1, is about six inches for harvesting such crops as beet tops and elevating them through the loader. Topper 1 is adjusted with respect to topper 2 by means of selecting the proper mounting holes 3' provided in the longitudinal frame members 38 and 39. These holes receive through bolts 3b which hold bearings 3 supporting the ends of the axial shafts 29 of the toppers. With such an adjustment of topper 1 with respect to topper 2 it would be necessary to adjust the mounting of engine 7 or if other drive belts were used, these would be of such length as to accommodate the setting of topper 1 with respect to its driving motor 7.

In adjusting the distance between the ends of the whiplashes at the "near zone $y$" the volume of air forced up through the hood of the loader is varied. By decreasing the clearance between the ends of the whiplashes at "near zone $y$" a greater volume of air is sent through the loader and thus a great amount of power is required to revolve each of the toppers.

In the modified form of hood shown in Figures 6, 8 and 9, the outlet duct 104 is about 18" in diameter. The smaller cross-sectional area of outlet duct 104 as contrasted with the upper end of the hood in Figure 1 tends to increase the speed of the air transiting the discharge duct. In the modified form of hood, auxiliary air suction or supply openings 107 are provided at the end of the axes of each of the toppers. It has been found that on harvesting such crops as alfalfa, these suction holes permit air to enter the hood from a point not directly at the surface and thus there is a reduction in the amount of dust and dirt picked up, without materially affecting the effectiveness of the elevation of the cut forage through the loader.

When the vertical and horizontal adjustments of toppers 1 and 2 have been made, engines 7 and 11 are started. By adjusting the throttles of these engines the speed of rotation of the toppers is varied. As a rule, both toppers are revolved at the same speed; however, if found necessary or advisable, the speed of the individual topper may be adjusted without affecting the speed of the other topper.

In the form of loader shown in Figures 1, 2 and 3, deflector 20 at the discharge point of the loader would be adjusted so as to direct the cut forage passing through the loader onto the ground or in the case of being loaded onto a truck, the cut could be deflected into the truck body.

The stabilizer at the rear of the harvester which includes the truck 6 and its suspension holds frame 4 and the revolvable toppers mounted therein in parallel relationship with a plane in which lies the general ground surface. This stabilizer also prevents the harvester from swaying from side to side as it passes over uneven ground surface.

This harvester and loader is a very flexible and useful agricultural implement. It is designed to mow, chop, partially mangle, elevate, and load the cut forage in one operation. Its flexible whiplashes permit plants such as beets to have their tops harvested while leaving their body and root portions undisturbed in the ground.

The foregoing detailed description and specific examples are given by way of illustration only and, while indicating preferred embodiments of the invention, are not given by way of limitation, since various changes within the spirit and scope of the invention may be made.

We claim as our invention:

1. In combination in a harvester, a wheel supported frame adapted to travel along the ground having plants to be harvested; a pair of revolvable toppers carried by said frame, each topper comprising an elongated core having a plurality of flexible normally limp whiplashes of substantially equal length, said toppers being arranged abreast with their core axes generally parallel to each other and to the general ground surface and generally transverse of said harvester so that the ends of the extending whiplashes of one topper are in close spaced relation to the ends of the oppositely extending whiplashes on the other topper when the toppers are rotated; means supporting said frame above the ground parallel with the plane of the general ground surface over which it is traveling irrespective of the position of the wheels, whereby the axes of said revolvable toppers are held in a parallel relationship with said plane of the general ground surface and in a position to cause said whiplashes to strike said plants so as to remove the appendages thereof and flexing on contacting the body portions of the plants to prevent injury thereto; a hood within which said toppers are housed having an open bottom through which said topper whiplashes rotate and an outlet duct leading from its top positioned above the toppers; said hood having a skirt portion extending down over each of said toppers in close spaced relationship thereto and in spaced relationship above the ground; and means for revolving said toppers about their axes in approaching opposite directions in their lower semi-circles of rotation at speeds to hold said whiplashes in outwardly extending positions to sever the appendages of said plants and to create currents of air within said hood which pass upwardly through said hood outlet duct; said revolving whiplashes and said air currents carrying the severed appendages upwardly through said hood and through its outlet duct.

2. A harvester of the character described in claim 1, wherein said hood includes auxiliary air suction openings arranged in spaced relation above said hood open bottom and said outlet duct leading from the top of said hood is swivelably mounted whereby the elevated cut appendages passing through said duct may be discharged at any point around said harvester.

3. In combination in a harvester, a wheel supported frame adapted to travel along the ground having plants to be harvested; a forward and a rear revolvable topper carried by said frame, each topper comprising an elongated core having a plurality of flexible normally limp whiplashes of substantially equal length, said toppers being arranged abreast with their core axes generally parallel to each other and to the general ground surface and generally transverse of said harvester so that the ends of the extending whiplashes of one topper are in close spaced relation to the ends of the oppositely extending whiplashes on the other topper when the toppers are rotated; means to adjust the distance between said core axes; adjustable means supporting said frame above the ground parallel with the plane of the general ground surface over which it is traveling irrespective of the position of the wheels, whereby the axes of said revolvable toppers are held in a parallel relationship with said plane of the general ground surface as the harvester passes over uneven ground and in a position to cause said whiplashes to strike said plants so as to remove the appendages thereof and flexing on contacting the body portions of the plants to prevent injury thereto; said rear revolvable topper severing and picking up appendages of plants that may have been missed by said forward topper; a hood within which said toppers are housed having an open bottom through which said topper whiplashes rotate and an outlet duct leading from its top above said toppers; said hood outlet duct being swivelably mounted so as to discharge at any selected position with respect to said harvester; and means for revolving said toppers about their axes in approaching opposition directions in their lower semi-circles of rotation and at speeds to hold said whiplashes in outwardly extending position to sever the appendages of said plants and to create currents of air within said hood which pass upwardly through said hood outlet duct; said revolving whiplashes and said air currents carrying the severed appendages upwardly through said hood and its outlet duct.

4. In combination in a harvester, a wheel supported frame adapted to travel along the ground having plants to be harvested; a pair of revolvable toppers carried by said frame, each topper comprising an elongated core having a plurality of flexible normally limp whiplashes, said toppers being arranged abreast with their core axes generally parallel to each other and generally transverse of said harvester; means supporting said frame above the ground parallel with the general ground surface over which it is traveling whereby the axes of said revolvable toppers are held in a parallel relationship with the general ground surface beneath and in a position to cause said whiplashes to strike said plants so as to remove the appendages thereof and flexing on contacting the body portions of the plants to prevent injury thereto; said supporting means comprises a vertically adjustable forward end mounting and a vertically adjustable rear end mounting, said rear end mounting including a pair of axle mounting beams, tandem axles mounted in said axle beams with their ends offset, truck wheels mounted on the offset ends of said axles, hydraulic piston and cylinder units interconnecting each of said axle beams with said harvester frame, a torque rod mounted on said frame in spaced parallel relationship to said axles having a rigidly attached arm at each end, and a link pivotally connecting each of said rigidly attached torque rod arms with said axle beams, whereby motion of said axle beams is imparted through said torque rod; a hood within which said toppers are housed having an open bottom through which said topper whiplashes rotate and an outlet duct leading from its top; and means for revolving said toppers about their axes in approaching opposite directions in their lower semi-circles of rotation and at speeds to hold said whiplashes in outwardly extending positions and to create currents of air within said hood which pass upwardly through said hood outlet duct, said revolving whiplashes and said air currents created by the revolving toppers carrying the severed appendages upwardly through said hood and through its outlet duct.

5. A harvester of the character described in claim 4, wherein said hood outlet duct has mounted thereon an adjustable deflector for deflecting the cut appendages as they are discharged from said outlet duct.

6. A harvester of the character described in claim 4, wherein said hood includes auxiliary air suction openings arranged in spaced relation above said hood open bottom and said outlet duct leading from the top of said hood is swivelably mounted whereby the elevated cut appendages passing through said duct may be discharged at any point around said harvester.

7. In combination in a harvester, a wheel supported frame adapted to travel along the ground having plants to be harvested, a pair of revolvable toppers carried by said frame, each topper comprising an elongated core having a plurality of flexible normally limp whiplashes of substantially equal length, said toppers being arranged abreast with their core axes generally parallel to each other and to the general ground surface so that the ends of the extending whiplashes of one topper are in close spaced relation to the ends of the oppositely extending whiplashes on the other topper when the toppers are rotated; a hood within which said toppers are housed having an open bottom and an outlet duct leading from the top above said toppers, said hood having a skirt portion which extends down over each topper in closed spaced relation thereto and in spaced relation above the ground; means for revolving said toppers about their axes in approaching opposite directions in their lower semi-circles of rotation and at speeds to hold said whiplashes in outwardly extending positions to create currents of air within said hood which pass upwardly through said hood outlet duct; and means adjustably supporting said frame above the ground to cause the ends of said whiplashes to strike said plants so as to remove the appendages thereof and flexing on contacting the body portions of the plants to prevent injury thereto; said revolving whiplashes and said air currents created by the revolving toppers carrying the removed appendages upwardly through said hood and through its outlet duct; said hood having auxiliary air suction openings arranged in spaced relation about said hood open bottom and said outlet duct leading from the top of said hood being swivelably mounted whereby the elevated cut appendages passing through said duct may be discharged at any point around said harvester.

8. A harvester comprising a wheel supported frame adapted to travel along the ground in which there are plants to be harvested, a pair of revolvable toppers carried by said frame, each topper consisting of an elongated core extending generally transverse of said harvester and a plurality of combined plant cutting and air impelling elements attached to said core, said revolvable toppers being arranged abreast and revolved about their axes in opposite directions toward each other in their lower semi-circles of rotation, a hood within which said toppers are housed having an open bottom and an outlet duct leading from the top above said toppers, said hood having a skirt portion extending down over each of said toppers in close spaced relationship thereto and in spaced relationship above the ground, means for revolving said toppers about their axes whereby the appendages of said plants are severed and upward currents of air are created in said hood and outlet duct, and means for adjustably supporting said frame above the ground to cause the cutting elements of said toppers to strike said plants so as to remove the appendages thereof, said revolving combined plant cutting and air impelling elements and said air currents created thereby carrying the removed appendages upwardly through said hood and outlet duct, said hood having auxiliary air suction openings arranged in spaced relation above said hood open bottom adjacent the ends of the elongated cores of said toppers and said outlet duct leading from the top of said hood being swivelably mounted whereby the elevated cut appendages passing through said duct may be discharged at any point around said harvester.

9. A harvester comprising a wheel supported frame adapted to travel along the ground having plants to be harvested, a pair of revolvable toppers carried by said frame, each topper consisting of an elongated core extending generally transverse of said harvester and a plurality of flexible normally limp whiplashes of substantially equal length attached thereto, said revolvable toppers being arranged abreast in a parallel relationship to each other and to the general ground surface so that the ends of the whiplashes of one topper are in close spaced relation to the ends of the oppositely extending whiplashes on the other topper when the toppers are rotated, said toppers being adapted to be revolved about their axes in opposite directions toward each other in their lower semi-circles of rotation, means for revolving the toppers about their axes at a speed to hold said whiplashes in outwardly extending positions, and means for supporting said frame above the ground to cause the ends of the lashes to strike said plants so as to remove the appendages thereof and flexing on contacting the body portions of the plants to prevent injury thereto, said means supporting the frame above the ground comprises a vertically adjustable rear end mounting, said rear end mounting including a pair of axle mounting beams, tamdem axles mounted in said axle beams with their ends offset, truck wheels mounted on the offset ends of said axles, hydraulic piston and cylinder units interconnecting each of said axle beams with said harvester frame, a torque rod mounted on said frame in spaced parallel relationship to said axles having a rigidly attached arm at each end, and a link pivotally connecting each of said rigidly attached torque rod arms with said axle beams, whereby motion of said axle beams is imparted through said torque rod.

10. In combination in a harvester, a wheel supported frame adapted to travel along the ground having plants to be harvested, a pair of revolvable toppers carried by said frame, each topper comprising an elongated core having a plurality of flexible normally limp whiplashes of substantially equal length, said toppers being arranged abreast with their core axes generally parallel to each other and to the general ground surface so that the ends of the extending whiplashes of one topper are in close spaced relation to the ends of the oppositely extending whiplashes on the other topper and in close spaced relation to the ground when said toppers are rotated; a hood mounted over said toppers having a lower portion open at the bottom and within which said toppers are housed and an upper portion above said toppers connected therewith having an outlet opening at the top thereof above said toppers, said lower portion having elongated arcuate skirt portions extending over opposite outer sector portions of said elongated toppers and vertically disposed end plates in close spaced relation to the ends of said elongated toppers and connected to said arcuate skirt portions and said upper portion of the hood above said toppers, each of said arcuate skirt portions extending from a juncture with said upper portion of the hood at a position approximately above the elongated axes of said toppers and outwardly from said juncture with the upper portion of the hood in a substantially concentric position over said toppers and the core axes thereof and in close spaced relation to the ends of the whiplashes on said revolvable toppers to a position below a horizontal plane containing the core axes of said toppers where they terminate in spaced relation above the ground, whereby said revolvable toppers and said hood form a pneumatic elevator for appendages of plants severed and picked up by said whiplashes on the revolvable toppers; and means for revolving said toppers about their axes in approaching opposite directions in their lower semi-circles of rotation and at speeds to hold said whiplashes in outwardly extending positions to cut and elevate said appendages and create currents of air within said hood which impel said cut appendages upwardly through said outlet opening in the upper portion of said hood.

11. A harvester of the character described in claim 10 wherein said vertically disposed end plates of the lower portion of said hood have auxiliary air suction openings therein adjacent the ends of said elongated cores of the toppers.

EARL H. BROCKMAN.
WILLIAM B. ALLISON.
MATTHEW M. MAXWELL.
KENNETH S. OVREGAARD.
CHARLES B. STEVENSON.

References Cited in the file of this patent

UNITED STATES PATENTS

| Number | Name | Date |
| --- | --- | --- |
| 1,206,409 | Bruce | Nov. 28, 1916 |
| 1,844,750 | Ellis | Feb. 9, 1932 |
| 2,352,854 | Miller | July 4, 1944 |
| 2,354,112 | Garst | July 18, 1944 |
| 2,460,029 | Ramp | Jan. 25, 1949 |
| 2,481,652 | Fort | Sept. 13, 1949 |
| 2,506,054 | Agee et al. | May 2, 1950 |